United States Patent [19]
Sebestyen

[11] 3,713,899
[45] Jan. 30, 1973

[54] THERMOCOUPLE PROBE

[75] Inventor: Thomas M. Sebestyen, Ann Arbor, Mich.

[73] Assignee: Ford Motor Company, Dearborn, Mich.

[22] Filed: Nov. 12, 1970

[21] Appl. No.: 88,774

[52] U.S. Cl. .................................136/233, 136/201
[51] Int. Cl. .................................................H01v 1/02
[58] Field of Search..............136/200, 201, 230–234

[56] References Cited

UNITED STATES PATENTS

| | | | |
|---|---|---|---|
| 3,121,038 | 2/1964 | Perotte | 136/230 X |
| 3,329,766 | 7/1967 | Cole | 136/234 X |
| 2,509,825 | 5/1950 | Keyser | 136/233 X |
| 1,827,252 | 10/1931 | Mollard | 136/233 X |
| 3,057,941 | 10/1962 | Schwartzwalder | 136/233 |
| 3,232,794 | 2/1966 | Korton | 136/233 |
| 2,517,053 | 8/1950 | Thompson | 136/233 X |
| 2,609,406 | 9/1952 | Barsy | 136/233 |
| 3,159,032 | 12/1964 | Rademacher et al | 136/231 |

OTHER PUBLICATIONS

Continental Sensing, Inc., "Con–O–Twist Cable Test Data," 1966, pp 1–7.

*Primary Examiner*—Carl D. Quarforth
*Assistant Examiner*—Harvey E. Behrend
*Attorney*—John R. Faulkner and Glenn S. Arendsen

[57] ABSTRACT

Sheaths of thermally unstable material are applied to the portions of the thermocouple wires adjacent the thermocouple junction. The sheathed wires are embedded in encapsulating material and then exposed to a temperature sufficient to degrade the sheath material in a manner that reduces its volume. Subsequent thermal expansion and contraction of the conductors takes place without mechanical stressing in the resulting open spaces surrounding each conductor.

9 Claims, 4 Drawing Figures

PATENTED JAN 30 1973

INVENTOR
Thomas M. Sebestyen
BY John R. Faulkner
Glenn J. Arendsen
ATTORNEYS

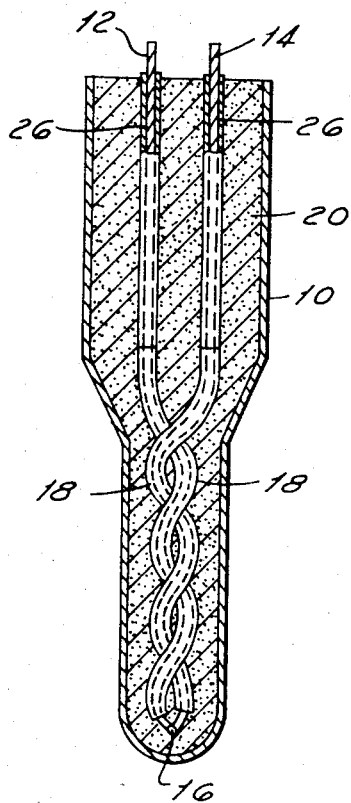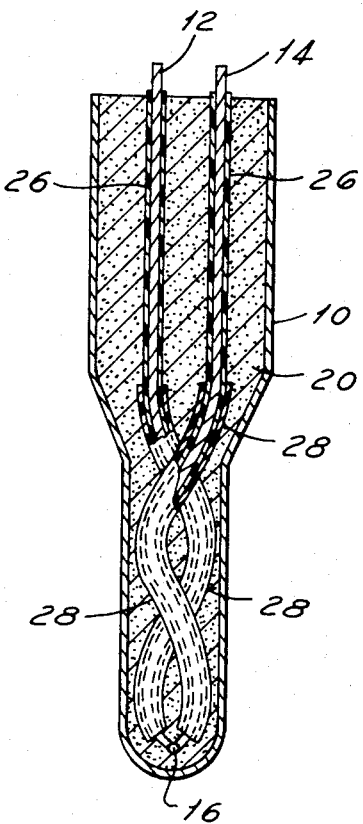

THERMOCOUPLE PROBE

SUMMARY OF THE INVENTION

Control systems for gas turbine engines require several temperature sensing devices that must be capable of satisfactory operation over an extended time period. Such operation necessarily involves numerous cycles in which the temperature sensing device is heated to its operating temperature and subsequently cooled to ambient. The operating temperatures can exceed 2,000°F. and the thermally generated stresses in the thermocouple wires of such devices can result in early failure.

This invention provides a thermocouple probe capable of operating for extended time periods in an environment involving rapid temperature fluctuations. In the probe, a pair of electrical conductors of dissimilar metals are joined together at a junction located within a suitable metal housing. Each of the conductors has a thermally unstable sheath of significant thickness on its length adjacent to but not including the junction. A thermally conducting encapsulating material fills the housing to embed the junction and the thermally unstable sheaths. After the encapsulating material is cured, the probe is exposed to a temperature at which the sheath material deteriorates or is modified in a manner that reduces its solid volume. Small channels thus are formed in the encapsulating material around each electrical conductor and these channels permit thermal expansion and contraction of the conductors without imposing undue mechanical stresses.

Temperature response is improved by reducing mechanically the diameter of the probe tip after the housing has been filled with encapsulating material but before the sheath volume has been reduced. The conductors can be twisted loosely prior to being embedded in the encapsulating material to increase the dimensional flexibility of the conductors.

Useful sheath materials include those that are combustible at the predetermined temperature or those that shrink upon exposure to the predetermined temperature. Suitable materials of the former type are ethyl cellulose, cellulose acetate, phenolic resins, polyvinyl acetate, polyamides, polyethylene, polypropylene, polystyrene, etc. Typical of materials that merely reduce in volume are the expanded or foamed versions of these polymeric materials as well as some types of polyvinyl chloride, polytetrafluoroethylene, silicone polymers, and others.

After any gases produced by the sheath volume reductions have been dissipated out of the probe, a thin seal of additional encapsulating material can be applied to the top of the probe to avoid atmospheric deterioration or contamination of the electrical conductors. In applications using sheath materials that do not produce significant amounts of gases during volume reductions, a composite sheath that inherently provides a seal can be used. The composite sheath can be a lower portion of thermally unstable sheath with an upper portion of thermally stable material. The upper portion of thermally stable material extends for a short distance into the probe and is surrounded by encapsulating material that forms a tight seal therewith. In an alternative construction, the entire electrical conductor can be surrounded initially with a thermally stable sheath material that has an outer coating of the thermally unstable material for the portion of its length adjacent the thermocouple junction. Encapsulating material forms a tight seal with the exposed thermally stable material and the volume of the outer coating of thermally unstable material is reduced as described above to provide the stress relieving channels. Typical thermally stable materials include the high temperature polyamides, polyimides, epoxy resins, and polyfluorocarbons or inorganic materials such as asbestos and electrically insulating ceramics.

BRIEF DESCRIPTION OF THE DRAWINGS

FIG. 3 shows a probe having a composite sheath in which the sheath adjacent the junction is thermally unstable material and the sheath removed from the junction is thermally stable material.

FIG. 4 shows a construction in which sheaths of thermally stable material surround the entire lengths of the electrical conductors and each sheath has a coating of thermally unstable material on its portion adjacent the junction.

DETAILED DESCRIPTION

Figure 1:
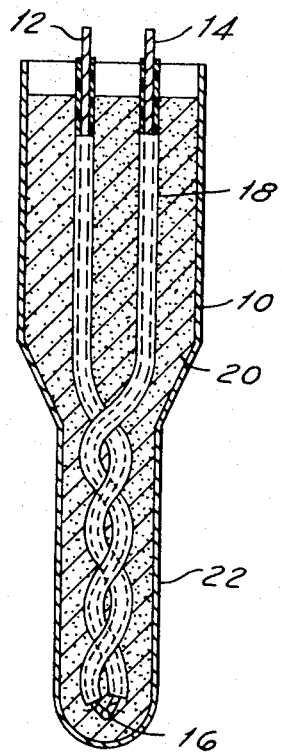
FIG. 1 is a sectioned elevation of a thermocouple probe of this invention showing the relationship of the conductors and thermally unstable sheaths to the encapsulating compound prior to volume reduction.

Referring to FIG. 1, the probe comprises an elongated cylindrical housing 10 that is closed at its lower end. The ends of a suitable pair of electrical conductors 12 and 14 are welded together to form a thermocouple junction 16 that is positioned near the lower end of housing 10. Each conductor has a sheath 18 of thermally unstable material surrounding its length adjacent to but not including junction 16.

To provide greater flexibility, conductors 12 and 14 are twisted loosely for a short distance adjacent junction 16. One or two loose twists are sufficient for most purposes and many applications can be satisfied with only partial twists. An encapsulating material 20 is packed into housing 10 to fill completely at least the lower portion of the housing. For probes designed to operate at moderate temperatures, a polymeric encapsulating material such as urea-formaldehyde, polyamide, polyimide, or other suitable polymers can be used. The encapsulating material can include small amounts of suitable thermally conducting fillers if desired. Encapsulating materials suitable for use in probes designed for high temperature applications can include a composite of inorganic fibers bounded together with an inorganic binder such as collodial silica.

Figure 2:
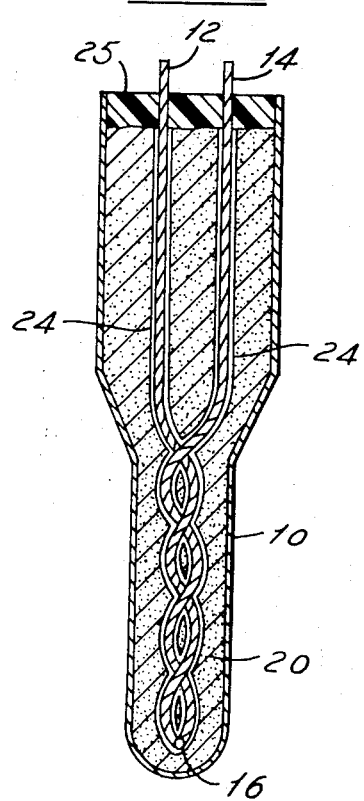
FIG. 2 shows the probe of FIG. 1 after the volume reduction has been effected and a thin layer of additional encapsulating material has been applied to seal the top of the probe.

After the encapsulating material has been packed tightly into the housing and has been cured, the tip portion indicated by numeral 22 of the assembly is swedged to a smaller diameter as shown in FIG. 1. The probe then is exposed to a temperature at which the volume of the sheath materials 18 is reduced. These volume reductions leave narrow channels 24 around the electrical conductors as shown in FIG. 2. A thin layer 25 of additional encapsulating material then is applied to the top of the probe to seal the exit portions of the conductors. In the resulting assembly, the conductors are free to expand and contract in channels 24 and thus do not generate undue mechanical stresses during cyclic operation.

Turning to the construction shown in FIG. 3, the thermally unstable sheaths 18 extend for only a short distance from junction 16. Beyond that distance a thermally stable sheath 26 surrounds each of the conductors. The thermally stable sheaths are embedded in at least a portion of the encapsulating material 20 which forms a tight seal therewith. Upon exposure to a predetermined temperature, the thermally unstable sheaths reduce in volume to leave channels around the lower portions of the conductors but the thermally stable sheaths 26 are unaffected thereby and maintain a sealing relationship with the encapsulating material. This arrangement can be used with thermally unstable sheaths that produce gases during volume reductions by initially filling the housing with encapsulating material to the lower edges of the thermally stable sheaths, effecting the volume reductions, and then applying the remainder of the encapsulating material.

In FIG. 4, thermally stable sheaths 26' surround the entire length of conductors 12 and 14 except for junction 16. A thermally unstable coating 28 is applied to the lower portions only of sheaths 26'. The conductors are embedded in encapsulating material as described above so that encapsulating material contacts at least a portion of sheaths 26'. Upon exposure to the predetermined temperature, coatings 28 reduce in volume to leave small channels. The thermally stable sheaths 26' are unaffected, however, and are free to flex in the channels.

In typical constructions suitable for gas turbine temperatures, probes initially about 0.1 inch in diameter have tips reduced to approximately 0.06 inch in diameter by a mechanical operation. One conductor is a nickel-chromium alloy of the type available commercially as chromel and the other is a nickel-aluminum alloy of the type available commercially as alumel. Each conductor has a diameter of about 15 mils and thermally unstable polyethylene sheaths can be applied in thicknesses capable of providing volume reductions of about 3 mils. Volume reductions of about 10-30 percent of the diameter of the conductors generally are desirable for applications involving large temperature variations.

The thermocouple junction can contact the probe housing in applications where the probe housing is insulated electrically from the thermocouple circuit. Encapsulating materials must be capable of withstanding higher temperatures than the thermally unstable sheath materials and must be chemically compatible with the sheath materials, but otherwise the variety of useful materials is quite unrestricted. Polymers of the same basic nature but with different temperature properties avoid problems of chemical incompatability and thermal expansion differences; for example, the thermally unstable sheaths can be made of a low temperature polyamide while the encapsulating material and any thermally stable sheaths are made of high temperature polyamide.

Thus this invention provides a thermocouple probe having greatly improved life in a cyclical temperature environment. The probe is adaptable readily to the mass production techniques essential to broad commercialization of gas turbine engines.

I claim:

1. A thermocouple probe comprising
a housing,
a pair of electrical conductors of dissimilar metals joined together at a junction within said housing, each of said conductors having a thermally unstable sheath of significant thickness on its length adjacent to but not including said junction, said thermally unstable sheaths reducing in volume when exposed to a temperature exceeding a predetermined minimum but less than the maximum operating temperature of the probe, and
encapsulating material filling said housing and embedding said junction and the lower portions of said thermally unstable sheaths so that exposing said lower portions of said sheaths to a temperature exceeding said predetermined minimum but less than the maximum operating temperature of the probe leaves channels around said conductors, said channels providing dimensional flexibility for said conductors.

2. The thermocouple probe of claim 1 in which the housing has an end portion of reduced size and the conductors are twisted loosely for the entire length of said end portion.

3. The thermocouple probe of claim 2 in which the sheaths are made of a polymeric material that is thermally degradeable at said minimum temperature.

4. The thermocouple probe of claim 3 in which each thermally unstable sheath is capable of providing a volume reduction of about 10-30 percent of the thickness of its electrical conductor.

5. The thermocouple probe of claim 4 in which each electrical conductor comprises an upper sheath spaced longitudinally along its length from said junction by said first mentioned sheath, said upper sheaths being thermally stable at the operating temperature of the thermocouple, said encapsulating material sealingly contacting portions of said upper sheaths to produce gas tight seals around the upper portions of said electrical conductors.

6. The thermocouple probe of claim 4 in which each electrical conductor has a thermally stable inner sheath surrounded by said thermally unstable sheath and said encapsulating material sealingly contacts portions of said thermally stable inner sheaths.

7. The thermocouple probe of claim 1 in which each thermally unstable sheath has a thickness providing a volume reduction of 10-30 percent of its conductor when exposed to a temperature exceeding said predetermined minimum.

8. The thermocouple probe of claim 1 in which each electrical conductor comprises an upper sheath spaced longitudinally along its length from said junction by said first mentioned sheath, said upper sheaths being thermally stable at the operating temperature of the thermocouple, said encapsulating material sealingly contacting portions of said upper sheaths to produce gas tight seals around the upper portions of said electrical conductors.

9. The thermocouple probe of claim 1 in which each electrical conductor has a thermally stable inner sheath surrounded by said thermally unstable sheath and said encapsulating material sealingly contacts portions of said thermally stable inner sheaths.

* * * * *